(12) United States Patent  
Padmanabhan et al.

(10) Patent No.: US 11,645,599 B2
(45) Date of Patent: May 9, 2023

(54) SYSTEM AND METHOD FOR AUTONOMOUS WORKFLOW MANAGEMENT AND EXECUTION

(71) Applicant: AUTONOM8 INC, Saratoga, CA (US)

(72) Inventors: Ranjit Padmanabhan, Saratoga, CA (US); Thekkethalackal Mammen Kurien, Bangalore (IN); George Mammen Jacob, Kottayam (IN); Balakrishnan Kavikkal, Chennai (TN)

(73) Assignee: AUTONOM8 INC, Saratoga, CA (US)

( * ) Notice: Subject to any disclaimer, the term of this patent is extended or adjusted under 35 U.S.C. 154(b) by 38 days.

(21) Appl. No.: 17/474,238

(22) Filed: Sep. 14, 2021

(65) Prior Publication Data

US 2023/0083159 A1 Mar. 16, 2023

(51) Int. Cl.
*G06Q 10/0633* (2023.01)
*G06Q 10/0631* (2023.01)
*G06N 7/01* (2023.01)

(52) U.S. Cl.
CPC .......... *G06Q 10/0633* (2013.01); *G06N 7/01* (2023.01); *G06Q 10/06316* (2013.01)

(58) Field of Classification Search
CPC combination set(s) only.
See application file for complete search history.

(56) References Cited

U.S. PATENT DOCUMENTS 11,463,315 B1 * 10/2022 Harwood ............ G06F 11/3442
2012/0011239 A1  1/2012 Svane et al.
2019/0243836 A1  8/2019 Nanda et al.
2021/0132947 A1 * 5/2021 John ...................... G06N 3/006
2021/0136012 A1 * 5/2021 Barbitta ............ G06Q 10/0633

FOREIGN PATENT DOCUMENTS

EP         3635551 A2      4/2020

OTHER PUBLICATIONS

The Role of Streaming Technology in Retail Banking; Dan Ortega; Jul. 16, 2019 (Year: 2019).*

(Continued)

*Primary Examiner* — Deirdre D Hatcher
(74) *Attorney, Agent, or Firm* — Jason C. Cameron

(57) ABSTRACT

A system for autonomous workflow management and execution is disclosed. The system includes a workflow builder module to create a workflow based on directed acyclic graphs, conversational submodules and a defined process. The system includes a data stream module to enable the workflow from the workflow builder module to achieve objectives based on a workflow specification, constraints and security considerations. The system includes a stream processor module including a data ingestion and processing submodule to fetch data from the data stream module and process the data based on operations to define and evaluate rules, heuristics and models with the workflow. The system includes a learning module to continuously recompute potential objectives and outcomes based on analysis of the optimized data. The processing subsystem includes a workflow orchestrator module to make decisions for automation of the workflow execution by triangulating data from a user, the data sources and the desired outcomes.

16 Claims, 7 Drawing Sheets

(56) References Cited

OTHER PUBLICATIONS

Ultimate guide to RPA (robotic process automation); Linda Tucci; May 17, 2021 (Year: 2021).*
Why and how to build autonomous systems; AI for Business & Tech Blog; Oct. 12, 2020 (Year: 2021).*
Deliver Scalable Data and Analytics Solutions with Application Workflow Orchestration.

* cited by examiner

SYSTEM AND METHOD FOR AUTONOMOUS WORKFLOW MANAGEMENT AND EXECUTION

FIELD OF INVENTION

Embodiments of the present disclosure relate to autonomous workflow management and execution, and more particularly to, a system and a method for self-directed, data-driven, self-learning, multi-outcome autonomous workflows as a service.

BACKGROUND

Workflows are the nervous system of any enterprise. Workflows connect people, data, and resources to fulfil customer requirements. An enterprise may be modeled as a network of interconnected workflows. The amount of information that enterprises and organizations receive, manage, and generate often grows significantly as they expand and evolve, making it tremendously difficult to manage and organize that information. When combining this volume of information with the growth of complexity that often exist in these organizations, the challenge of managing the information may become intractable. Many workflow management systems have been developed to help organize information, often by creating workflows, breaking projects down into steps or tasks. Parts of information are then associated with a particular workflow, each of which may be further associated with workflow items such as tasks or subtasks.

A successful workflow generates value which exceeds its cost. There may be other measurable benefits e.g., customer satisfaction, revenue. Enterprises seek to optimize multiple business metrics. Current workflow platforms provide the ability to learn from prior use. They are able to identify patterns of behavior based on data and conditions and may apply these patterns to subsequent journeys to optimize business metrics. However, current platforms have critical limitations for modeling workflows e.g., the structure being immutable (states and transitions cannot be added or removed) or that all internal states must be pre-specified. More specifically, while such platforms may help optimize business metrics, the platform first requires these workflows to be created and manually defined. Moreover, these tools typically require a human to review any newly added information and determine its relation to a particular project and task. In addition, many such platforms operate with information which is internal to the enterprise, despite the fact that items of information associated with a particular workflow often reside outside the organization. Thus, in attempting to solve one problem, these workflow platforms may create many other challenges for businesses and organizations, including inaccuracy, delay and information fragmentation.

Hence, there is a need for an improved system and method for autonomous workflow management and execution to address the aforementioned issue(s).

BRIEF DESCRIPTION

In accordance with an embodiment of the present disclosure, a system for autonomous workflow management and execution is provided. The system includes a processing subsystem hosted on a server. The processing subsystem is configured to execute on a network to control bidirectional communications among a plurality of modules. The processing subsystem includes a workflow builder module configured to create a workflow based on information comprising output from at least one of one or more directed acyclic graphs, one or more conversational submodules and a defined process. The processing subsystem also includes a data stream module configured to provide the workflow from the workflow builder module to achieve one or more objectives based on at least one of a workflow specification, one or more constraints and security consideration. The processing subsystem further includes a stream processor module communicatively coupled to the data stream module. The stream processor module includes a data ingestion and processing submodule configured to fetch data from the data stream module and process the data based on one or more operation to obtain optimized data. The stream processor module also includes a rule evaluation and model invocation submodule configured to define and evaluate rules, heuristics and models based on the workflow and bind the optimized data with the rules, heuristics and models. The processing subsystem further includes a learning module which is configured to continuously recompute one or more potential objectives and outcomes based on real-time analysis of the optimized data and a control flow using a plurality of learning techniques. The processing subsystem further includes a workflow orchestrator module communicatively coupled to the learning module. The workflow orchestrator module is configured to make decisions for automation of the workflow execution by triangulating data from a user, optimizing data with the rules, heuristics and models and recomputing one or more potential objectives and outcomes.

In accordance with another embodiment of the present disclosure, a method for autonomous workflow management and execution is provided. The method includes creating, by a workflow builder module, a workflow based on information comprising output from at least one of one or more directed acyclic graphs, one or more conversational submodules and a defined process. The method also includes providing, by a data stream module, the workflow from the workflow builder module to achieve one or more objectives based on at least one of a workflow specification, one or more constraints and security considerations. The method further includes fetching, by a data ingestion and processing submodule, data from the data stream module and processing the data with one or more operations to obtain optimized data. The method further includes defining and evaluating, by a rule evaluation and model invocation submodule, rules, heuristics and models based on the workflow and binding the optimized data with the rules, heuristics and models. The method further includes continuously recomputing, by a learning module, one or more potential objectives and outcomes based on learning of the optimized data and a control flow using a plurality of learning techniques. The method further includes making, by a workflow orchestrator module, decisions for automation of the workflow execution by triangulating data from a user, optimized data with rules, heuristics and models and recomputing one or more potential objectives and outcomes.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
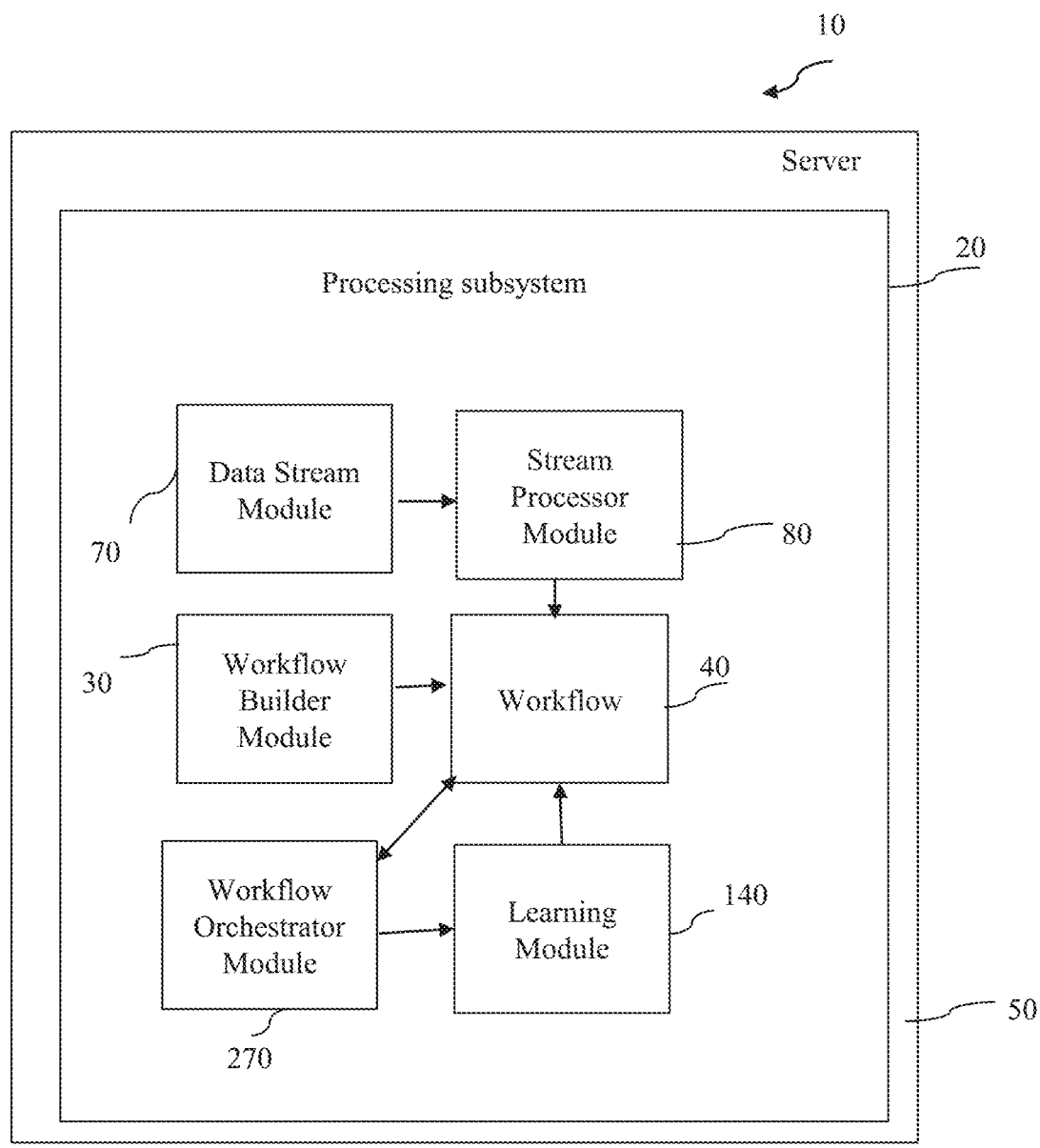
FIG. 1 is a block diagram representation of system for autonomous workflow management and execution in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for autonomous workflow management and execution. Workflows are a very important part of any enterprise. An autonomous enterprise is a self-driving business that continually senses, adapts, predicts, optimizes and acts, in an incessantly evolving external and internal environment. The autonomous enterprise applies machine learning and intelligent automation to dynamically match resource demand and supply in real-time, enabling optimal operation of the business. The autonomous enterprise is a learning ecosystem that, over time, requires less and less human intervention and oversight. In some ways this reflects the concept of autonomous vehicles, applied to business, combining automation, workflows, and intelligence. An enterprise may be modeled as a network of interconnected workflows. The system for workflow management and execution is described in detail from FIG. 1.

FIG. 1 is a block diagram representation of a system 10 for autonomous workflow management and execution in accordance with an embodiment of the present disclosure. The system 10 also includes a processing subsystem 20 hosted on a server 50. In one embodiment, the server 50 may be a cloud-based server. In another embodiment, parts of the server 50 may be a local server coupled to a user device. The processing subsystem 20 is configured to execute on a network to control bidirectional communications among a plurality of modules. In one embodiment, the network may include one or more terrestrial and/or satellite networks interconnected to communicatively connect the user device to web server engine and a web crawler. In one example, the network may be a private or public local area network (LAN) or Wide Area Network (WAN), such as the Internet. In another embodiment, the network may include both wired and wireless communications according to one or more standards and/or via one or more transport mediums. In one example, the network may include wireless communications according to one of the 802.11 or Bluetooth specification sets, or another standard or proprietary wireless communication protocol. In yet another embodiment, the network may also include communications over a terrestrial cellular network, including, a GSM (global system for mobile communications), CDMA (code division multiple access), and/or EDGE (enhanced data for global evolution) network.

Figure 2:
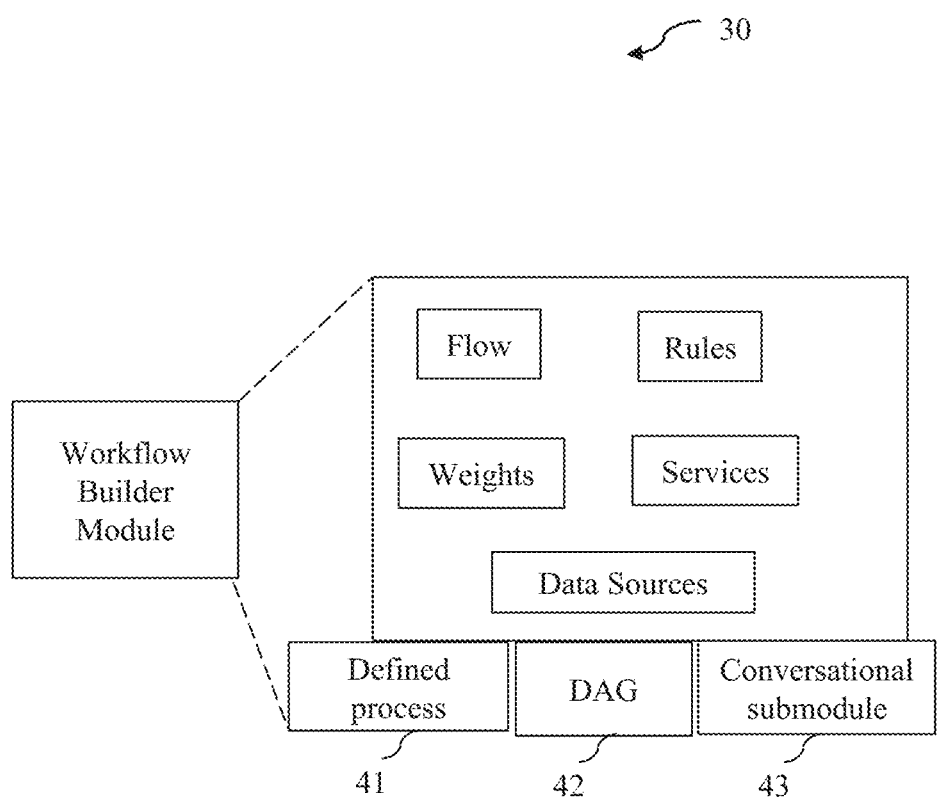
FIG. 2 is a block diagram representation of a workflow builder of FIG. 1 in accordance with an embodiment of the present disclosure.

The processing subsystem 20 includes a workflow builder module 30 which is configured to create a workflow 40 based on information including an output from at least one of one or more directed acyclic graphs 41, one or more conversational submodules 42 and a defined process 43. In one embodiment, the workflow 40 includes states, transitions, data accrued at each state, conditions and resources. The states are defined as the steps in the workflow including start and end. The transitions are defined as a path for a workflow to transition from one state to the next state. The conditions are defined, and specific paths are chosen during workflow execution as inferred by specified conditions when multiple paths are available. The resources are defined as external systems to or from which data is written or read. States and transitions define the structure of a workflow. This is generally manifested as a state diagram or flow diagram, with nodes depicting the states and arrows depicting the transitions. The states and transitions define the structure of a workflow. This is generally manifested as a state diagram or flow diagram, with nodes depicting the states and arrows depicting the transitions. The workflow builder is described in detail in FIG. 2. In a specific embodiment, the workflows 40 may be executed without traversing all internal states and the specific path is dependent on the conditions. However, the start and end states are mandatory. In one embodiment, the one or more directed acyclic graphs are configured for data pipelining corresponding to one or more data sources. As used herein, directed acyclic graph may be used to represent a network of processing elements. In this representation, data enters a processing element through its incoming edges and leaves the element through its outgoing edges. In a specific embodiment, the one or more conversational modules are driven by a plurality of conversational events from a chatbot. In some embodiments, the data may arrive from a variety of sources, including applications, web pages, and chatbots. Similarly, as used herein, the business process is a series of steps designed to produce a product or service. In one embodiment, the workflow builder module 30 is configured to define one or more data sources for the workflow. The data sources may include credentials and access keys. In such an embodiment, the one or more data sources may include local resources, databases, devices, human actions or an event stream. More specifically, as autonomous vehicles rely on data sources such as traffic, road conditions, and weather, businesses may benefit from autonomous workflows by configuring them to listen to relevant data sources. As IoT devices become prevalent, sensors are an important source of such data. This module specifies the data sources for a given workflow. Some of these data sources might require credentials and other access keys.

The processing subsystem 20 also includes a data stream module 70 configured to provide the workflow from the workflow builder module 30 to achieve one or more objectives based on at least one of a workflow specification, one or more constraints and security consideration. The workflow 40 is specified in an appropriate format in states, transitions, data (fields), conditions, resources. More specifically, the workflow specification may be expressed in any form which conveys states and transitions. They may range from a single state to something as general as a directed graph. However, the start and end states should be designated (they may be the same state).

Figure 3:
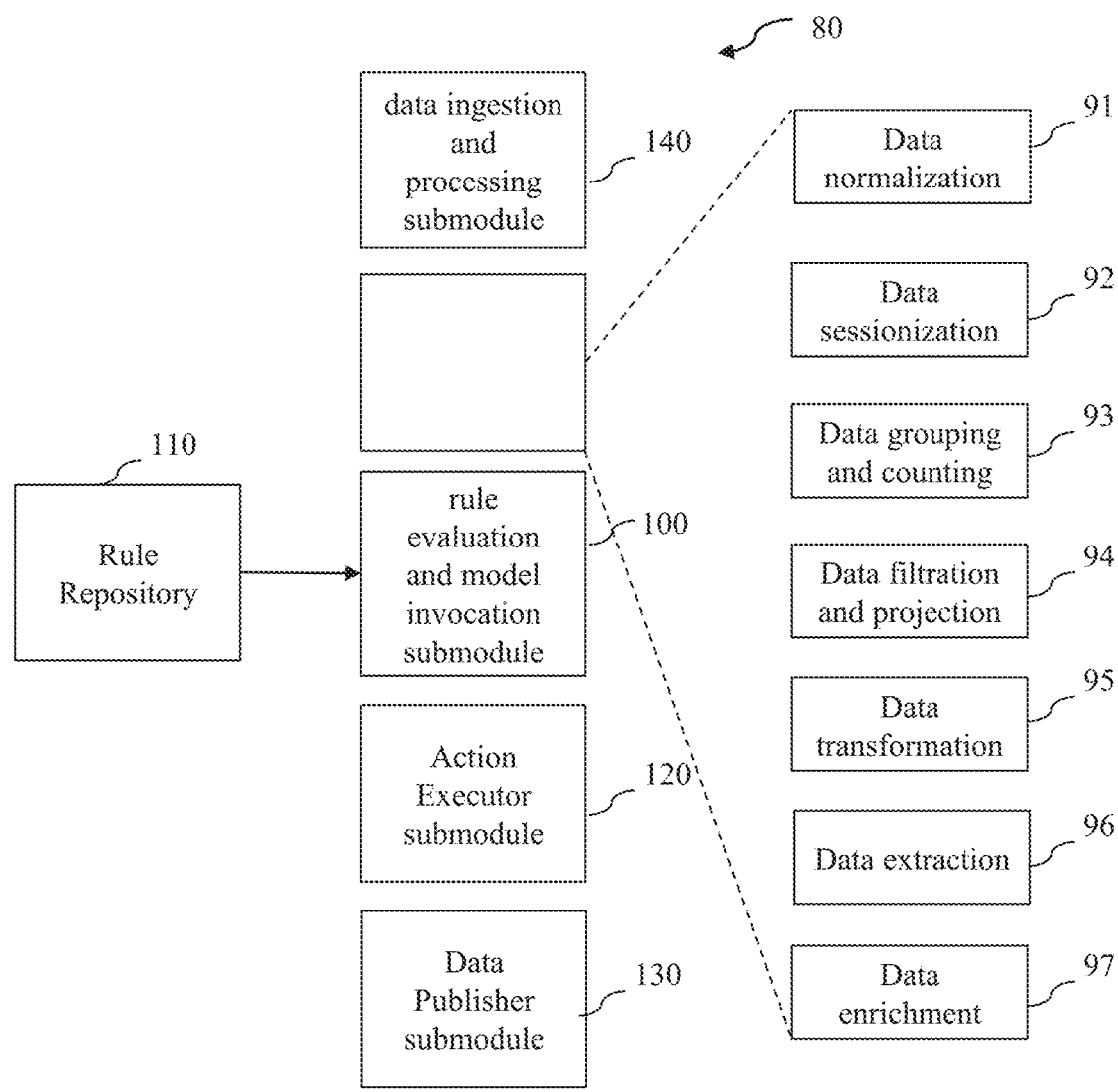
FIG. 3 is a block diagram representation of a stream processor module of FIG. 1 in accordance with an embodiment of the present disclosure.

The processing subsystem 20 further includes a stream processor module 80 communicatively coupled to the data stream module 70. The stream processor module is described in detail in FIG. 3. The stream processor module 80 includes a data ingestion and processing submodule 90 configured to fetch data from the data stream module and process the data based on one or more operations to obtain optimized data. In one embodiment, the one or more operations may include at least one of data normalization 91, data sessionization 92, data grouping and data counting 93, data filtration and data projection 94, data transformation 95, data extraction 96, and data enrichment 97. As used herein, the data normalization is the organization of data to appear similar across all records and fields. The data normalization increases the cohesion of entry types leading to cleansing and higher quality data. The data sessionization is arranging data in a sequence of actions or requests made by a user during the course of an interaction. Further, the data grouping is data formed by aggregating individual observations of a variable into groups, so that a frequency distribution of these groups serves as a convenient means of summarizing or analyzing the data. The data filtration is the process of choosing a smaller part of data set and using that subset for viewing or analysis. The data filtration eliminates the unwanted or redundant data. Furthermore, the data is projected to the user for further view or analysis. The data transformation is the process of converting data from one format, structure or values of data into another format, structure or values of data as per the requirement. Similarly, the data enrichment refers to the process of appending or otherwise enhancing collected data with relevant context obtained from additional sources. This additional information enriches the original data with corresponding context.

The stream processor module 80 also includes a rule evaluation and model invocation submodule 100 configured to define and evaluate rules, heuristics and models based on the workflow and bind the optimized data with the rules, heuristics and models. The rules, heuristics, models and the corresponding functions specify how the data from the data sources should affect the workflow. In one embodiment, each data source specified is materialized as a cloud adapter. This could encode the required credentials to ensure that data can be streamed from the source. The cloud adapter also embodies the functions which define how the data should be applied for making workflow decisions. In a specific embodiment, the rules evaluation and model invocation submodule 100 is communicatively coupled to a rule repository 110. The rule repository 110 is a critical component to defining and ensuring the most important part of business requirements. The rule repository 110 stores the business rules and their descriptive information as they are harvested, starting with scoping, and tracing to where the rules are implemented (e.g., in a manual process or in procedural code or in a business rule engine).

Subsequently, in some embodiments, the stream processor module 80 includes an action executor submodule 120 which is configured to process real time input data based on a plurality of learning techniques. In another embodiment, the stream processor module 80 includes a data publisher submodule 130 which is configured to publish the real time input data, processed by the action executor submodule, for the user. In such an embodiment, the user may reside on any device with which an agent may interact such as iOS®, Android®, on any form factor device for example tablet, phone, desktop or the like. In a specific embodiment, the user and server may communicate via multiple channels such as text message, Slack, chat, WhatsApp®, or the like. In another embodiment, the client and server may communicate and exchange information with a variety of media including text, voice, images, and video. In a specific embodiment, the end-user may not be human but may in fact be a bot, the end of another workflow, an IoT device, or any agent (software or hardware) capable of issuing an event to invoke the autonomous workflow and potentially receiving responses.

Figure 4:
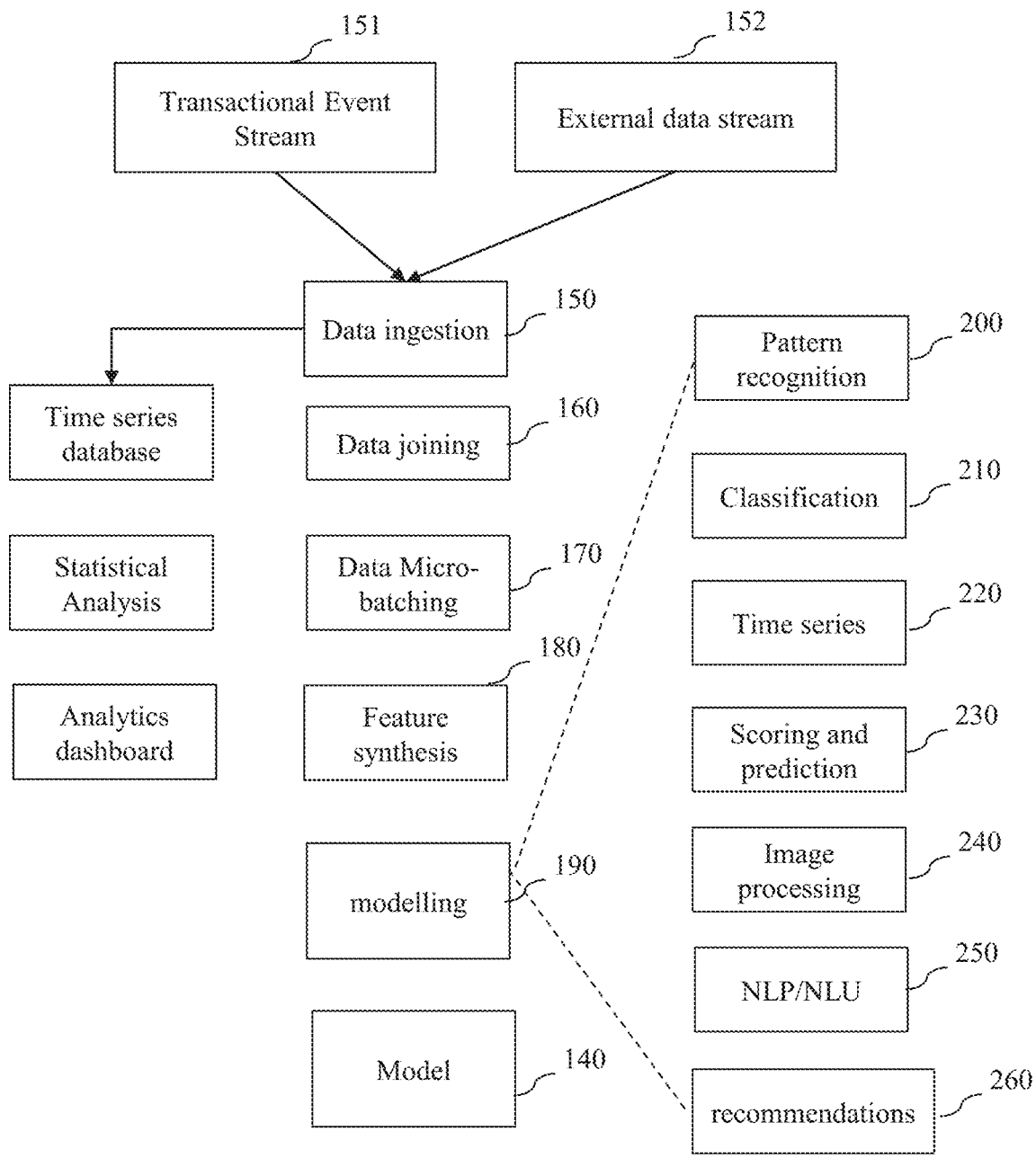
FIG. 4 is a block diagram representation of a learning module of FIG. 1 in accordance with an embodiment of the present disclosure.

The processing subsystem 20 further includes a learning module 140 which is configured to continuously recompute one or more potential objectives and outcomes based on learning of the optimized data and a control flow using a plurality of learning techniques. In one embodiment, the outcome may include one or more lists of matrices corresponding to an enterprise seeking to optimize workflow and a corresponding mathematical function to describe a corresponding optimal value. The desired outcomes may include maximize revenue, minimize cost, or the like. In detail, the learning module expresses how data and control flow through the various stages of the system to enable real-time decisioning (such as adding new states or removing unnecessary states) and learning. The learning module is described in detail in FIG. 4. In one embodiment, the plurality learning techniques may include data ingestion technique 150, data joining technique 160, micro-batching technique 170, feature synthesis technique 180 and modelling technique 190. The data ingestion technique 150 enables the transportation of optimized data from a transactional event stream and an external data stream. Further, upon extracting the optimized data, the data joining technique 160 combines the data extracted from different sources. The combined data further grouped into one or more groups to perform one or more associated tasks using a micro-batching technique.

Moreover, a feature synthesis technique 170 analyzes relational data from the optimized data and automatically synthesize one or more additional learning variables. Subsequently, a modelling technique 180 is configured to train a learning model using a plurality of intelligence techniques. In one embodiment, the plurality of intelligence techniques may include at least one of pattern recognition 200, classification 210, time series 220, scoring and prediction 230, image processing 240, natural language processing/natural language understanding 250 and recommendation 260.

As used herein, the pattern recognition and classification are the process of recognizing patterns by using machine learning algorithms. The classification of data based on knowledge already gained or on statistical information extracted from patterns and/or their representation is performed by the pattern recognition and classification technique. Further, the time series technique uses the previous time steps as input variables and use the next time step as the output variable to train the learning model. As used herein, the process of using the prediction model to make predictions is called scoring. The process examines the attributes for each data and assigns a predictive score that reflects how accurately the trained model predicted outcomes for that data. Furthermore, in case of data as images, image processing techniques are used to analyze the image and train the learning models using corresponding outputs. Similarly, to understand the context, sense or intent of the data, natural language processing and natural language understanding techniques are used to train the learning model with the actual context, sense or intent of the data. Once the model is trained, the trained model is deployed to handle the real time data in order to execute the workflow.

The processing subsystem 20 further includes a workflow orchestrator module 270 communicatively coupled to the learning module 140. The workflow orchestrator module 270 is configured to make decisions for automation of the workflow execution by triangulating data from a user, optimizing data with the rules, heuristics and models and recomputing one or more potential objectives and outcomes. As the end-user interacts with the workflow through the client, every event is passed to the orchestrator (server) which decides how the client application should continue its interaction with the end-user. The outcomes need not be explicitly specified. Under some conditions these could be inferred for example based on the use-case or the goals of the workflow. However, the workflow orchestrator module will need to be aware of these so that it can make the proper decisions.

Furthermore, when the system concludes that a change is required, the workflow orchestrator module takes appropriate action for example, asking the user for permission. The workflows are dynamically reconfigured to generate and satisfy potential objectives. Success or failure is measured to ensure that the system learns for the future. In one embodiment, the workflow is invoked in an unattended mode when the workflow is triggered by a programmatic event generated by a software or a hardware. The workflow need not be interactive and does not require a human end-user.

Figure 5:
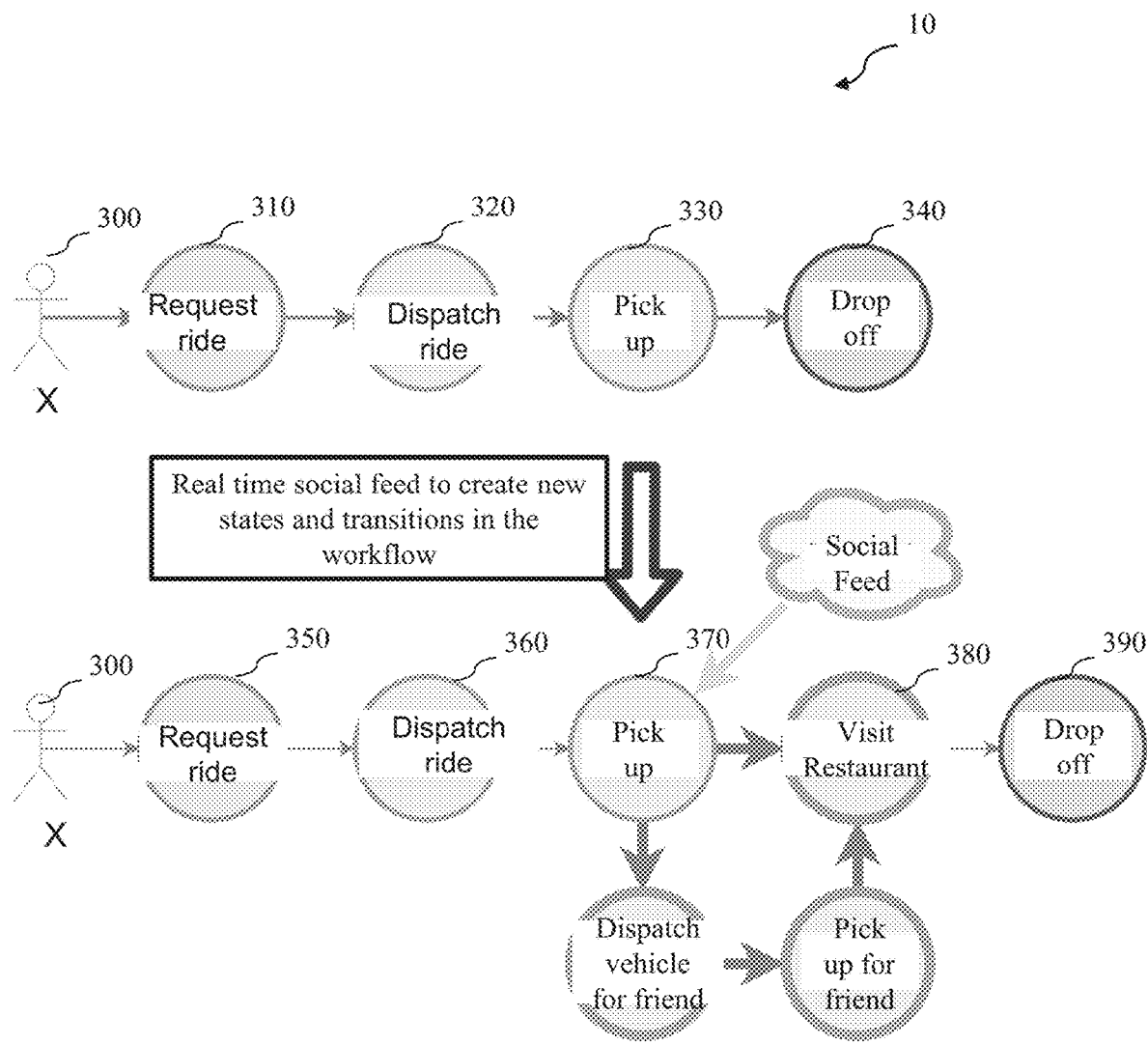
FIG. 5 is a schematic representation of an exemplary system of FIG. 1 in accordance with an embodiment of the present disclosure.

FIG. 5 is a schematic representation of an exemplary embodiment of the system of FIG. 1 in accordance with an embodiment of the present disclosure. considering an example where cab service provider wants to upsell food service to their riders. Assuming a user X is on a cab ride to catch a flight. The workflow includes:

Request ride→Dispatch ride→Pick up→Drop off

The person X receive a notification that the flight is delayed. Simultaneously, the person X receive a social feed update that a friend is nearby. The cab servicer provider platform asks if you would like to meet at an Y food service providing location. This option would not be available if the workflow had to remain unchanged. The person X can choose from various options which are clearly annotated with details of distance, price, occupancy, and time. The system enables the person X to make a selection. New actions are added to workflow by the system. The ride is rerouted, and the friend of person X is notified. Another cab ride is dispatched to pick the friend and bring her to the proper location. The updated workflow includes:

Request ride→Dispatch ride→Pick up→Visit Restaurant-→Drop off

The data sources include:

Flight Timings, Social Media, restaurant locator, vehicle locator, Coffee shop telemetry and friend locator The data stream module enables the user (the enterprise: in this example, Cab service provider) to define desired outcomes, data sources, constraints, and security considerations. These are exposed via a configuration panel. The enterprise may define as many or as few data sources as they need. The workflow orchestrator may also discover and add new data sources as applicable for example, the learning model may request weather information to properly compute traffic speed and will surface this as an option to the enterprise.

The solution includes:
Specify START & END points
END=Primary Outcome
Define Secondary Outcomes
Data Sources
Systems
Ambient
Unstructured
Constraints
Security such as Authentication
In one embodiment, the solution is implemented as:
Prefect: flow representation
DAG: flow audits & transaction ledger
Dask: runtime engine for learning ops
TimeScaleDB: time series logging
Scikit-learn, Tensorflow, H2O.ai: models and learning.
Apache Kafka: streaming data, telemetry
GKE: Container orchestration
Autonom8 CJaaS: workflow builder, adapter framework, conversational tools.

The enterprise (cab service provider) defines relevant data feeds and desired outcomes into the platform. At the invocation of a workflow, the platform starts listening to the real-time data streams. As new events are received from both the workflow and the streams, the platform continually recomputes potential objectives and outcomes based on intelligent analysis and triangulation. When the platform concludes that a change is required, it takes appropriate action for example, asking the user for permission. The workflows are dynamically reconfigured to generate and satisfy new objectives. Success or failure is measured to ensure that the system learns for the future. This can only be accomplished if workflows may be mutated, and new states may be dynamically added. This increases revenue to cab service provider, enhances user satisfaction and builds customer loyalty.

Figure 6:
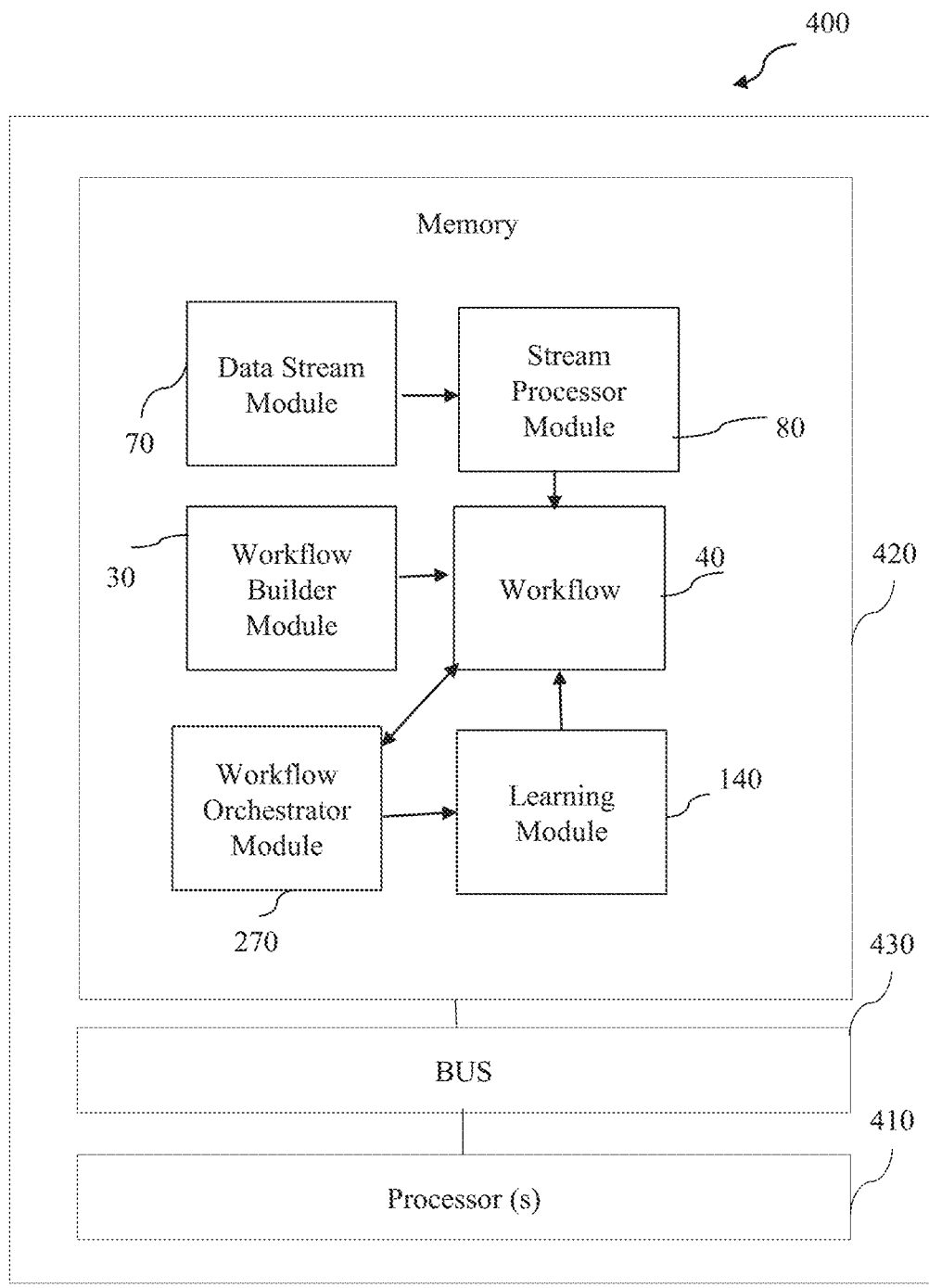
FIG. 6 is a block diagram of a computer or a server for system in accordance with an embodiment of the present disclosure.

FIG. 6 is a block diagram of a computer or a server 400 for system 10 in accordance with an embodiment of the present disclosure. The server includes processor(s) 410, and memory 420 operatively coupled to the bus 430.

The processor(s) 410, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 420 includes a plurality of subsystems and a plurality of modules stored in the form of executable program which instructs the processor 410 to perform the method steps illustrated in FIG. 1. The memory 420 is substantially similar to the system 10 of FIG. 1. The memory 420 has following subsystems: the processing subsystem 20 including a workflow builder 30, a data stream module 70, a stream processor module 80 including a data ingestion and processing submodule 90 and a rule evaluation and model invocation submodule 100, a learning module 140 and a workflow orchestrator module 270.

The processing subsystem includes a workflow builder module configured to create a workflow based on information comprising output from at least one of one or more directed acyclic graphs, one or more conversational submodules and a defined process. The processing subsystem also includes a data stream module configured to provide the workflow from the workflow builder module to achieve one or more objectives based on at least one of a workflow specification, one or more constraints and security considerations. The processing subsystem further includes a stream processor module communicatively coupled to the data stream module. The stream processor module includes a data ingestion and processing submodule configured to fetch data from the data stream module and process the data based on one or more operations to obtain optimized data. The stream processor module also includes a rule evaluation and model invocation submodule configured to define and evaluate rules, heuristics and models based on the workflow and bind the optimized data with the rules, heuristics and models. The processing subsystem further includes a learning module to continuously recompute one or more potential objectives and outcomes based on learning of the optimized data and a control flow using a plurality of learning techniques. The processing subsystem further includes a workflow orchestrator module communicatively coupled to the learning module. The workflow orchestrator module is configured to configured to make decisions for automation of the workflow execution by triangulating data from a user, optimized data with the rules, heuristics and models and recomputed one or more potential objectives and outcomes.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 410.

Figure 7:
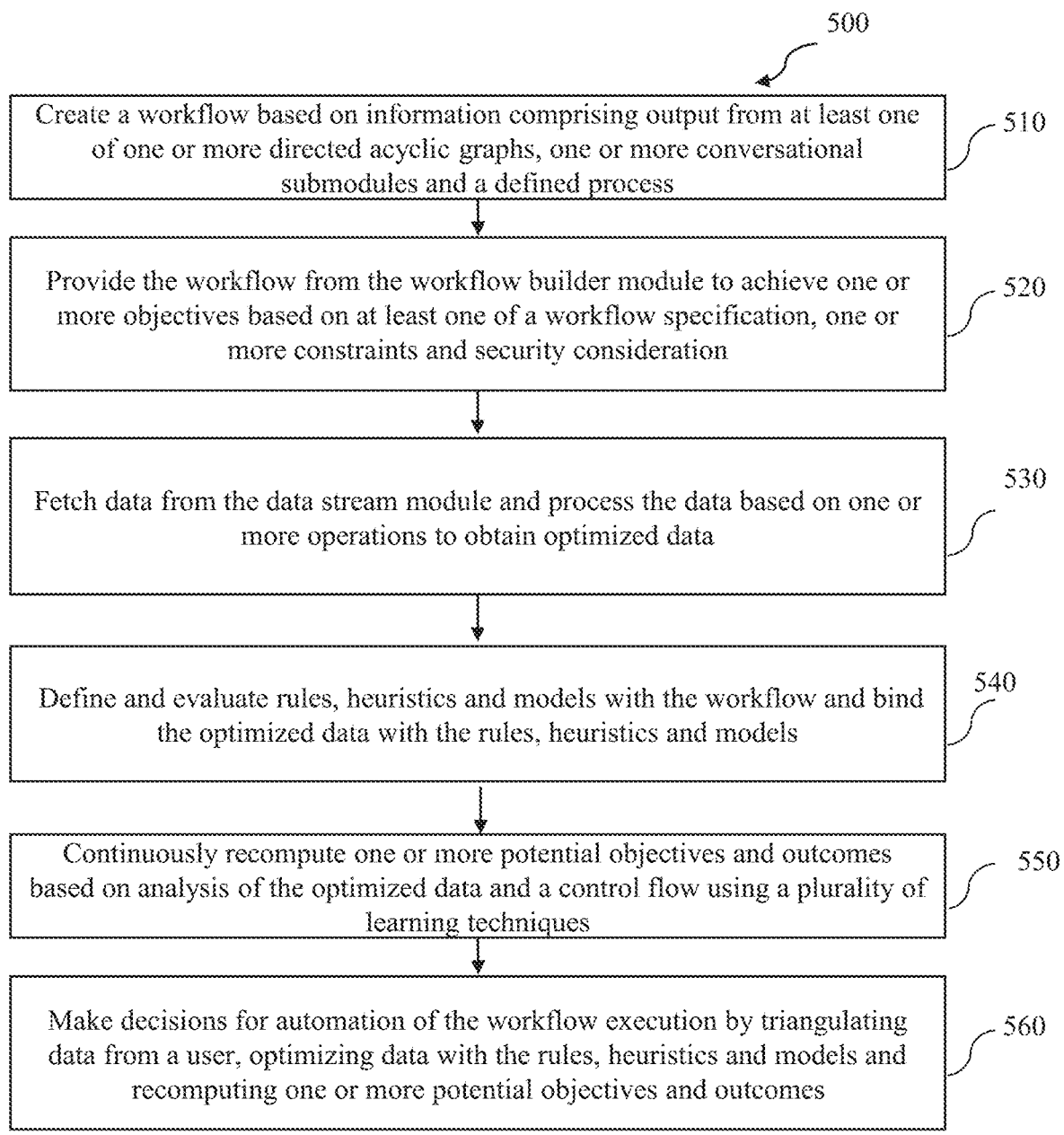
FIG. 7 illustrates a flow chart representing the steps involved in a method for autonomous workflow management and execution in accordance with an embodiment of the present disclosure.

FIG. 7 is a flow chart representing steps involved in a method 500 for autonomous workflow management and execution in accordance with an embodiment of the present disclosure. The method 500 includes creating a workflow based on information comprising output from at least one of one or more directed acyclic graphs, one or more conversational submodules and a defined process in step 510. In one embodiment, creating a workflow can be based on information entered through a workflow builder module. In a specific embodiment, the workflow includes states, transitions, data accrued at each state, conditions and resources. In some embodiments, the one or more directed acyclic graphs are configured for data pipelining corresponds to one or more data sources. In one embodiment, the one or more conversational modules are driven by a plurality of conversational events from a chatbot. In a preferred embodiment, the workflow builder module is configured to define one or more data sources for the workflow, wherein the data sources could include credentials and access keys. In such an embodiment, the one or more data sources may include local resources, databases, devices, human actions or any event stream.

The method 500 also includes providing the workflow from the workflow builder module to achieve one or more objectives based on at least one of a workflow specification, one or more constraints and security consideration in step 520. In one embodiment, providing the workflow from the workflow builder module to achieve one or more objectives by a data stream module. In some embodiments, the workflow specification is configured to define the workflow in a predefined format such as states, transitions, data (fields), conditions, resources.

The method 500 further includes fetching data from the data stream module and processing the data with one or more operations to obtain optimized data in step 530. In one embodiment, fetching data from the data stream module and process the data is based on one or more operation by a data ingestion and processing submodule. In a specific embodiment, the one or more operation comprises at least one of data normalization, data sessionizing, data grouping, data counting, data filtration, data projection, data transformation, data extraction, and data enrichment.

The method 500 further includes defining and evaluating rules, heuristics and models based on the workflow and binding the optimized data with the rules, heuristics and models in step 540. In one embodiment, defining and evaluating rules, heuristics and models by a rule evaluation and model invocation submodule. In a specific embodiment, processing, by an action executor submodule, real time input data based on the plurality of learning techniques. In such an embodiment, publishing, by a data publisher submodule, the real time input data, processed by the action executor submodule, for the user.

The method 500 further includes continuously recomputing one or more potential objectives and outcomes based on learning of the optimized data and a control flow using a plurality of learning techniques in step 550. In one embodiment, continuously recomputing one or more potential objectives and outcomes by a learning module. In a specific embodiment, continuously recomputing one or more potential objectives and outcomes based on learning of the optimized data and a control flow using a plurality of learning techniques which may include a micro-batching technique configured to group the optimized data to perform one or more associated tasks. In such embodiment, the plurality of learning techniques may include a feature synthesis technique configured to analyze relational data from the optimized data and automatically synthesize one or more additional learning variables. In another embodiment, the plurality of learning technique may include a modelling technique configured to train a learning model using a plurality of intelligence techniques, wherein the plurality of intelligence technique comprises at least one of pattern recognition, classification, time series, scoring and prediction, image processing, natural language processing/natural language understanding and recommendation.

The method 500 further includes making decisions for automation of the workflow execution by triangulating data from a user, optimized data with the rules, heuristics and models and recomputed one or more potential objectives and outcomes in step 560. In one embodiment, making decisions for automation of the workflow execution by a workflow orchestrator module. In some embodiments, the workflow is invoked in an unattended mode when the workflow is triggered by a programmatic event generated by a software or a hardware. In a specific embodiment, the workflow orchestrator module runs on a user device and establishes communication with the user on a predetermined channel.

Various embodiments of the system and method for autonomous workflow management and execution as described above enables real-time learning with updated models for each step in the workflow. States and transitions are dynamically picked from a pool of options. The system uses dynamic rules which are dependent on incoming data at any state. The system enhances the adaptability of workflows to evolve and satisfy the needs of enterprises. By applying this approach, the system is able to build and deploy workflows which mutate dynamically in response to certain stimuli.

5G, edge computing, and related trends are unleashing rich new data streams ranging from social media updates to sensor telemetry. Traditional workflows are too inflexible to react and adapt to rapidly changing influences. A truly autonomous workflow should have the ability to harness these data in real-time and be more responsive to requirements of consumers and enterprises. The system provides reduced cost and enhance customer satisfaction. Desired outcomes need not be explicitly specified. They can be abstracted as problem statements or inferred from business goals.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for autonomous workflow management and execution comprising:
   a processor; and
   a memory operatively coupled to a bus, wherein the memory comprises a plurality of modules stored in the form of executable program which instructs the processor, wherein the plurality of modules comprising:
      a workflow builder module configured to create a workflow based on information comprising output from at least one of one or more directed acyclic graphs, one or more conversational submodules and a defined process;
      a data stream module configured to provide the workflow from the workflow builder module to achieve one or more objectives based on at least one of a workflow specification, one or more constraints and security consideration;
      a stream processor module communicatively coupled to the data stream module, wherein the stream processor module comprises:
         a data ingestion and processing submodule configured to fetch data from the data stream module and process the data with one or more operations to obtain optimized data;
         a rule evaluation and model invocation submodule configured to define and evaluate rules, heuristics and models based on the workflow and binding the optimized data with the rules, heuristics and models;
      a learning module configured to continuously recompute one or more potential objectives and outcomes based on real-time analysis of the optimized data and a control flow using a plurality of learning techniques, wherein continuously recomputing the one or more potential objectives and outcomes based on the real-time analysis of the optimized data and the control flow comprising:
         extracting, using a data ingestion technique, the optimized data from a transactional event stream and an external data stream;
         combining, using a data joining technique, data extracted from the transactional event stream and the external data stream;
         grouping, using a micro-batching technique, the combined data into one or more groups to perform one or more associated tasks;
         analyzing, using a feature synthesis technique, relational data from the optimized data and automatically synthesizing one or more additional learning variables; and
         training, using a modelling technique, train a learning model using a plurality of intelligence techniques; and
      a workflow orchestrator module communicatively coupled to the learning module, the workflow orchestrator module is configured to make decisions for automation of the workflow execution by triangulating data from a user, optimizing data with the rules, heuristics and models and recomputing one or more potential objectives and outcomes.

2. The system of claim 1, wherein the workflow comprises states, transitions, data accrued at each state, conditions and resources.

3. The system of claim 1, wherein the one or more directed acyclic graphs are configured for data pipelining corresponding to one or more data sources.

4. The system of claim 1 wherein the one or more conversational modules are driven by a plurality of conversational events from a chatbot.

5. The system of claim 1, wherein the workflow specification is configured to define the workflow in a predefined format.

6. The system of claim 1, wherein the outcomes comprise one or more lists of matrices corresponding to an enterprises seeking to optimize workflow and a corresponding mathematical function to describe a corresponding optimal value.

7. The system of claim 1, wherein the workflow builder module is configured to define one or more data sources for the workflow, wherein the data sources comprise credentials and access keys.

8. The system of claim 7, wherein the one or more data sources comprise local resources, databases, devices, human actions or an event stream.

9. The system of claim 1, wherein the one or more operations comprise at least one of data normalization, data sessionization, data grouping, data counting, data filtration, data projection, data transformation, data extraction, and data enrichment.

10. The system of claim 1, wherein the workflow orchestrator module runs on a user device and establishes communication with the user on a predetermined channel.

11. The system of claim 1, wherein the workflow is invoked in an unattended mode when the workflow is triggered by a programmatic event generated by software or hardware.

12. The system of claim 1, wherein the stream processor module comprises:
an action executor submodule configured to process real time input data based on the plurality of learning techniques; and
a data publisher submodule configured to publish the real time input data, processed by the action executor submodule, for the user.

13. The system of claim 1, wherein the plurality of intelligence techniques comprises at least one of pattern recognition, classification, time series, scoring and prediction, image processing, natural language processing/natural language understanding and recommendation.

14. A method comprising:
creating, by a workflow builder module, a workflow based on information comprising output from at least one of one or more directed acyclic graphs, one or more conversational submodules and a defined process;

providing, by a data stream module, the workflow from the workflow builder module to achieve one or more objectives based on at least one of a workflow specification, one or more constraints and security consideration;
fetching, by a data ingestion and processing submodule, data from the data stream module and processing the data with one or more operations to obtain optimized data;
defining and evaluating, by a rule evaluation and model invocation submodule, rules, heuristics and models based on the workflow and binding the optimized data with the rules, heuristics and models;
continuously recomputing, by a learning module, one or more potential objectives and outcomes based on real-time analysis of the optimized data and a control flow using a plurality of learning techniques, wherein continuously recomputing the one or more potential objectives and outcomes based on the real-time analysis of the optimized data and the control flow comprising:
extracting, using a data ingestion technique, the optimized data from a transactional event stream and an external data stream;
combining, using a data joining technique, data extracted from the transactional event stream and the external data stream;
grouping, using a micro-batching technique, the combined data into one or more groups to perform one or more associated tasks;
analyzing, using a feature synthesis technique, relational data from the optimized data and automatically synthesizing one or more additional learning variables; and
training, using a modelling technique, train a learning model using a plurality of intelligence techniques; and
making, by a workflow orchestrator module, decisions for automation of the workflow execution by triangulating data from a user, optimizing data with the rules, heuristics and models and recomputing one or more potential objectives and outcomes.

15. The method of claim 14, comprising:
processing, by an action executor submodule, real time input data based on the plurality of learning techniques; and
publishing, by a data publisher submodule, the real time input data, processed by the action executor submodule, for the user.

16. The method of claim 14,
wherein the plurality of intelligence techniques comprise at least one of: pattern recognition, classification, time series, scoring and prediction, image processing, natural language processing/natural language understanding and recommendation.

* * * * *